United States Patent

Niiyama et al.

[11] Patent Number: 5,888,168
[45] Date of Patent: Mar. 30, 1999

[54] HYDRAULIC CONTROL APPARATUS FOR A CONTINUOUSLY VARIABLE TRANSMISSION

[75] Inventors: Tsunefumi Niiyama; Yasushi Ohmatoi, both of Saitama, Japan

[73] Assignee: Honda Giken Kogyo Kabushiki Kaisha, Tokyo, Japan

[21] Appl. No.: 949,978

[22] Filed: Oct. 14, 1997

[30] Foreign Application Priority Data

Oct. 11, 1996 [JP] Japan ..................................... 8-270256

[51] Int. Cl.⁶ ............................... F16H 63/24; F16H 9/10
[52] U.S. Cl. .................................. 477/49; 477/46; 474/28
[58] Field of Search ................................. 477/46, 48, 49; 474/28, 8, 11, 17, 148

[56] References Cited

U.S. PATENT DOCUMENTS

| | | | |
|---|---|---|---|
| 4,680,990 | 7/1987 | Ohgami | 477/49 X |
| 4,721,019 | 1/1988 | Nakamura et al. | 477/49 |
| 4,790,214 | 12/1988 | Hattori et al. | 477/48 |
| 5,319,999 | 6/1994 | Morishigo et al. | 477/46 |

*Primary Examiner*—Charles A. Marmor
*Assistant Examiner*—Sherry Lynn Estremsky
*Attorney, Agent, or Firm*—Lyon & Lyon LLP

[57] ABSTRACT

A hydraulic control apparatus for a continuously variable transmission which can produce stable drive pulley pressure and driven pulley pressure and also control the speed change time. The line pressure regulated by the regulator valve 22 is supplied to the control valve $24_{DR}$ of the drive pulley 5 and to the control valve $24_{DN}$ of the driven pulley 7. These control valves regulate the line pressure according to the PB pressure and the PC pressure output from the solenoid valves SOL-B, SOL-C, respectively, and produce the drive pulley pressure $P_{DR}$ and the driven pulley pressure $P_{DN}$. When the PB pressure and the PC pressure are both zero, and $P_{DR}=P_{DN}$, the control apparatus maintains the same gear ratio. When the PB pressure is increased from zero while keeping the PC pressure at zero, i.e. $P_{DR}>P_{DN}$, the gear ratio changes toward the high-speed overdrive. When the PC pressure is increased from zero while holding the PB pressure at zero, i.e. $P_{DR}<P_{DN}$, the gear ratio changes toward the low-speed gear.

4 Claims, 10 Drawing Sheets

4-WAY VALVE STROKE: AMOUNT
OF CONTROL OF SOLENOID VALVE B

HYDRAULIC CONTROL APPARATUS FOR A CONTINUOUSLY VARIABLE TRANSMISSION

The present invention relates to a continuously variable transmission having an endless belt reeved around a drive pulley and a driven pulley and more particularly to a hydraulic control apparatus for hydraulically controlling the gear ratio of the transmission.

BACKGROUND OF THE INVENTION

FIG. 10A is a diagrammatic illustration of a conventional hydraulic control apparatus for belt type continuously variable transmissions. The delivery pressure of an oil pump is regulated by a PH regulator valve and a PL regulator valve. A high or PH pressure output and a low or PL pressure output from these regulator valves are switched by a four-way valve to supply the PH pressure to a drive pulley and the PL pressure to a driven pulley to change the gear ratio to a high-speed or overdrive (OD) speed gear. The PL pressure is supplied to the drive pulley and the PH pressure is supplied to the driven pulley to change the gear ratio to a low (LOW) speed gear. The PH regulator valve and the PL regulator valve are controlled by a common solenoid valve A, and the four-way valve is controlled by a solenoid valve B.

This conventional hydraulic control apparatus, however, has a drawback that, as shown in FIG. 10B, once the amount of control of the solenoid valve A is determined, the pressure difference between the PH pressure and the PL pressure is also determined, making it impossible to arbitrarily control the speed change time of the belt type continuously variable transmission. Further, with the four-way valve used in the above conventional hydraulic control apparatus the dimension of overlap between a spool groove and a valve body port cannot be controlled easily. Still another problem is that, as shown in FIG. 10C, because of a sharp change in the output hydraulic pressure with respect to the stroke of the spool of the four-way valve, it is difficult to make a fine speed change control.

SUMMARY OF THE INVENTION

The present invention has been accomplished under these circumstances and its objective is to provide a hydraulic control apparatus for a continuously variable transmission that can output a stable pulley pressure and control the speed change time by the use of solenoid valves, and which does not require a four-way valve.

In a preferred embodiment of the hydraulic control apparatus of this invention for a continuously variable transmission, the apparatus comprises: a regulator valve producing a line pressure; a first solenoid valve producing a first control pressure; a first control valve to regulate the line pressure according to the first control pressure to produce a drive pulley pressure; a second solenoid valve to produce a second control pressure; a second control valve to regulate the line pressure according to the second control pressure to produce a driven pulley pressure; and a control means to fix an electric current value applied to one of the first and second solenoid valves and change an electric current value applied to the other solenoid valve. When the values of the electric currents applied to the first and second solenoid valves are both fixed, the line pressures are not regulated by the first and second solenoid valves but are output as a drive pulley pressure and a driven pulley pressure, thus holding the gear ratio. When the current value applied to the second solenoid valve is fixed and the current value applied to the first solenoid valve is changed, the first control pressure output from the first solenoid valve changes, causing the drive pulley pressure produced by the first control valve to change, with the result that the gear ratio is changed by the pressure difference between the pulley pressures. Conversely, fixing the current value applied to the first solenoid valve and changing the current value applied to the second solenoid valve results in a change in the second control pressure output from the second solenoid valve, which in turn changes the driven pulley pressure output from the second control valve. The resulting pressure difference between the two pulley pressures causes the gear ratio to change.

Because the pressure difference between the drive pulley pressure and the driven pulley pressure is changed arbitrarily according to the changing electric current value, the speed change time can be controlled. Further, because the drive pulley pressure and the driven pulley pressure are controlled individually by the first control valve and the second control valve, respectively, the stability of the hydraulic control system improves. Moreover, because the current values of the first and second solenoid valves are not changed simultaneously, the load on the control means is reduced.

Another aspect of the hydraulic control apparatus of this invention is that when a third control pressure output to the regulator valve from a third solenoid valve is changed, the line pressure output from the regulator valve changes. It is thus possible to reduce the hydraulic pressure load by lowering the line pressure when the current values of the first and second solenoid valves are fixed to hold the gear ratio.

Still another aspect of the hydraulic control apparatus defined of this invention is that because the line pressure output from the regulator valve changes in proportion to a change in the third control pressure lower than the line pressure, it is possible to cause a change in the pulley pressure to follow a change in the line pressure by urging the spools of the control valves in opposite directions by the drive pulley pressures and the third control pressure to hold the spools at balanced positions. At this time, because the third control pressure, lower than the line pressure, is used as the follow-up oil pressure, the oil leakage becomes smaller than when the line pressure is used.

A still further aspect of the hydraulic control apparatus of this invention is that the control valve outputs a low-pressure side pulley pressure when the current value applied to the solenoid valve is fixed and, when the current value is changed, outputs a high-pressure side pulley pressure. The high-pressure side pulley pressure has a pressure difference with respect to the low-pressure side pulley pressure, the pressure difference corresponding to the changing solenoid current. Hence, while the accuracy of the high-pressure side pulley pressure may be degraded by errors of the pressure difference, the low-pressure side pulley pressure requiring high accuracy for control is not affected by the errors of the pressure difference and therefore can maintain its accuracy.

Other and more detailed objects, features and aspects of this invention will appear from the following description of preferred embodiments and the drawings.

DESCRIPTION OF THE PREFERRED EMBODIMENTS OF THE INVENTION

Figure 1:
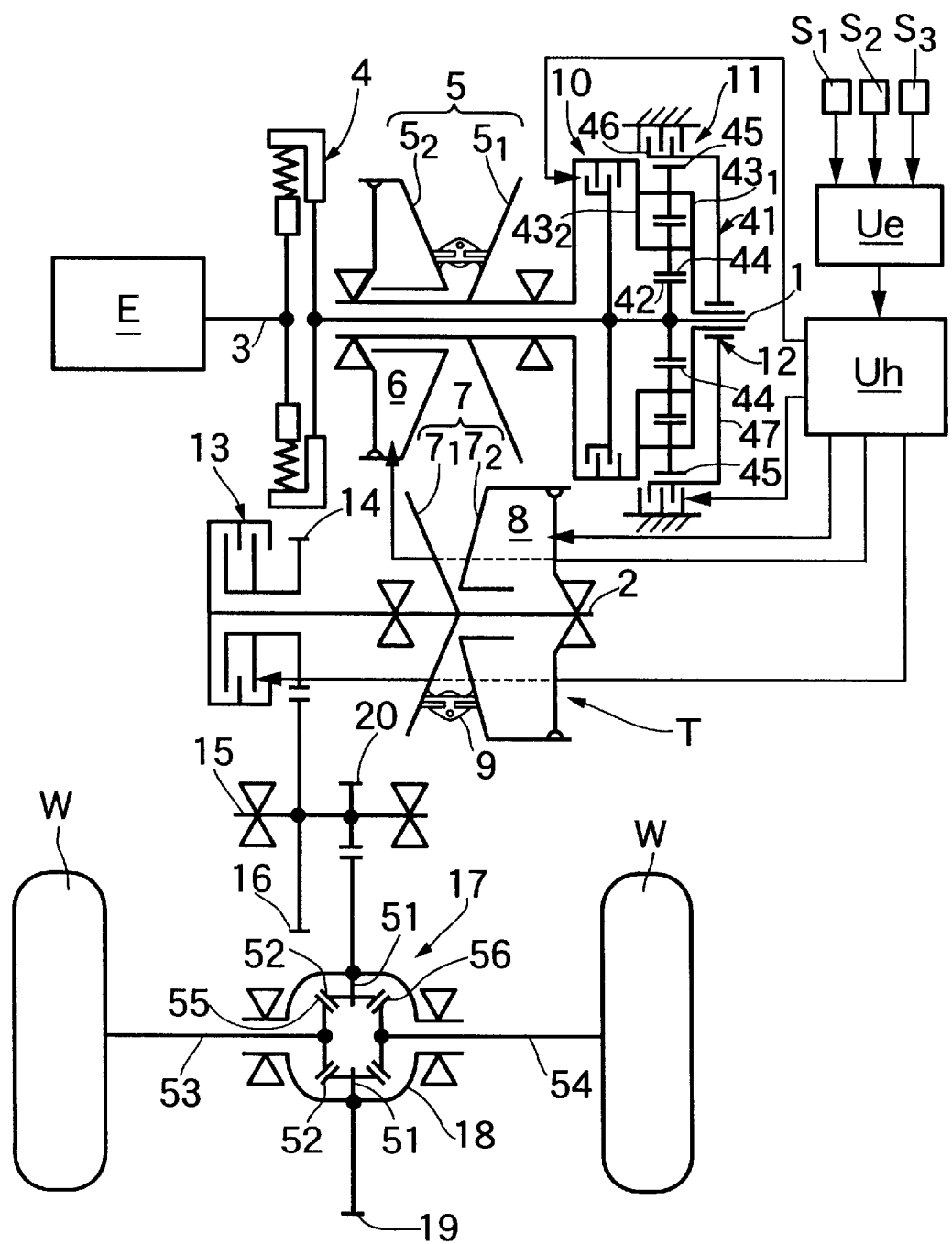
FIG. 1 is a skeleton diagram showing a power transmission system of a vehicle.

Preferred embodiments of the present invention will be described by referring to the accompanying drawings, wherein FIG. 1 illustrates a power transmission system to which each embodiment of the invention is applicable.

As shown in FIG. 1, the belt type continuously variable transmission T for a vehicle has an input shaft 1 and an output shaft 2 arranged in parallel, with a right end of a crank shaft 3 of the engine E connected to a left end of the input shaft 1 through a flywheel damper 4.

A drive pulley 5 supported on the input shaft 1 has a stationary pulley half $5_1$, rotatable relative to the input shaft 1 and a movable pulley half $5_2$ axially slidable relative to the stationary pulley half $5_1$. The width of the groove formed between the movable pulley half $5_2$ and the stationary pulley half $5_1$ can be varied by an oil pressure acting on a hydraulic chamber 6. A driven pulley 7 supported on the output shaft 2 has a stationary pulley half $7_1$ fixed to or formed integral with the output shaft 2 and a movable pulley half $7_2$ axially slidable relative to the stationary pulley half $7_1$. The width of the groove formed between the movable pulley half $7_2$ and the stationary pulley half $7_1$ can be varied by an oil pressure acting on a hydraulic chamber 8. An endless belt 9 comprising two strips of strap having a number of press pieces attached thereto is reeved around the drive pulley 5 and the driven pulley 7 to couple these pulleys.

The right end of the input shaft 1 is provided with a forward-reverse changeover mechanism 12 in the form of a planetary gear system, which includes a forward clutch 10 that, when establishing a forward gear change, engages to transmit the rotation of the input shaft 1 in the same direction to the drive pulley 5 and a reverse brake 11 that, when establishing a reverse gear change, engages to transmit the rotation of the input shaft 1 in the reverse direction to the drive pulley 5.

A startup clutch 13 is provided at the left end of the output shaft 2 and has a first intermediate gear 14 that is rotatably supported on the output shaft 2 connected to the stationary pulley half $7_1$ of the driven pulley 7 that is fixed to the output shaft 2. On an intermediate shaft 15 arranged parallel to the output shaft 2 is mounted a second intermediate gear 16 that meshes with the first intermediate gear 14. A third intermediate gear 20 mounted on the intermediate shaft 15 meshes with an input gear 19 that is provided on a gear box 18 of a differential gear 17. A pair of pinions 52, 52 supported on the gear box 18 through pinion shafts 51 are meshed with side gears 55, 56 provided at the ends of a left axle 53 and a right axle 54, respectively, and both side gears are relatively rotatably supported on the gear box 18. The other ends of the left axle 53 and the right axle 54 are mounted with drive wheels W, W.

An electronic control unit Ue receives signals from an accelerator opening sensor $S_1$, an engine revolution sensor $S_2$, an intake air negative pressure sensor $S_3$, and the like. Based on the signals from these sensors $S_1$–$S_3$, the electronic control unit Ue outputs a control signal to a hydraulic control unit Uh, which then controls the groove widths of the drive pulley 5 and driven pulley 7, i.e., the gear ratio of the belt type continuously variable transmission T, the engagement condition of the forward clutch 10, the engagement condition of the reverse brake 11, and the engagement condition of the startup clutch 13.

Next, the construction of the forward-reverse changeover mechanism 12 will be explained. A planetary gear system 41 provided at the right end of the input shaft 1 comprises a sun gear 42 splined onto the input shaft 1; planetary carriers $43_1$, $43_2$ formed of a pair of plates and rotatably supported on the input shaft 1; three inner pinions 44 rotatably supported on the planetary carriers $43_1$, $43_2$ and meshing with the sun gear 42; three outer pinions 45 rotatably supported on the planetary carriers $43_1$, $43_2$ and meshing with the inner pinions 44; a ring gear 46 meshing with the outer pinions 45; and a ring gear support member 47 supporting the ring gear 46 rotatably around an outer periphery of the input shaft 1.

Next, operation of how the embodiment with the above construction will be explained.

When a forward range is chosen by a select lever, the electronic control unit Ue issues a control signal to engage the forward clutch 10, causing the input shaft 1 to be coupled to the drive pulley 5. This is followed by the engagement of the startup clutch 13 causing the torque of the engine E to be transmitted through the input shaft 1, drive pulley 5, endless belt 9, driven pulley 7, output shaft 2 and differential gear 17 to the drive wheels W, W, propelling the car forwardly.

When a reverse range is chosen by a select lever, the electronic control unit Ue issues a control signal to engage the reverse brake 1, coupling the ring gear support member 47 and the ring gear 46 to the casing to hold them unrotatable. The inner pinions 44 and the outer pinions 45 are in mesh with the rotating sun gear 42 and the fixed ring gear 46 to move around input shaft 1 along with the planetary carriers $43_1$, $43_2$ while rotating on their axes. As a result, the drive pulley 5 coupled to the planetary carriers $43_1$, $43_2$ is driven with a reduced revolution speed, in a direction opposite to the rotating direction of the input shaft 1, thus driving the car rearwardly.

At this time, by the hydraulic control unit Uh controlling the oil pressure acting on the hydraulic chamber 6 of the drive pulley 5 and the hydraulic chamber 8 of the driven pulley 7 in the belt type continuously variable transmission T, the gear ratio can be adjusted continuously. That is, the oil pressure acting on the hydraulic chamber 8 of the driven pulley 7 is increased relative to the oil pressure acting on the hydraulic chamber 6 of the drive pulley 5 to reduce the groove width of the driven pulley 7 and thereby increase the effective radius of the driven pulley 7, which in turn causes the groove width of the drive pulley 5 to increase, reducing its effective radius. As a result, the gear ratio of the belt type continuously variable transmission T changes continuously toward the low-speed gear. Conversely, when the oil pressure acting on the hydraulic chamber 6 of the drive pulley 5 is increased relative to the oil pressure acting on the hydraulic chamber 8 of the driven pulley 7, the groove width of the drive pulley 5 is reduced, increasing the effective radius of the drive pulley 5, which in turn causes the groove width of the driven pulley 7 to increase, reducing its effective radius. The gear ratio of the belt type continuously variable transmission T therefore changes continuously toward the overdrive.

Figure 2:
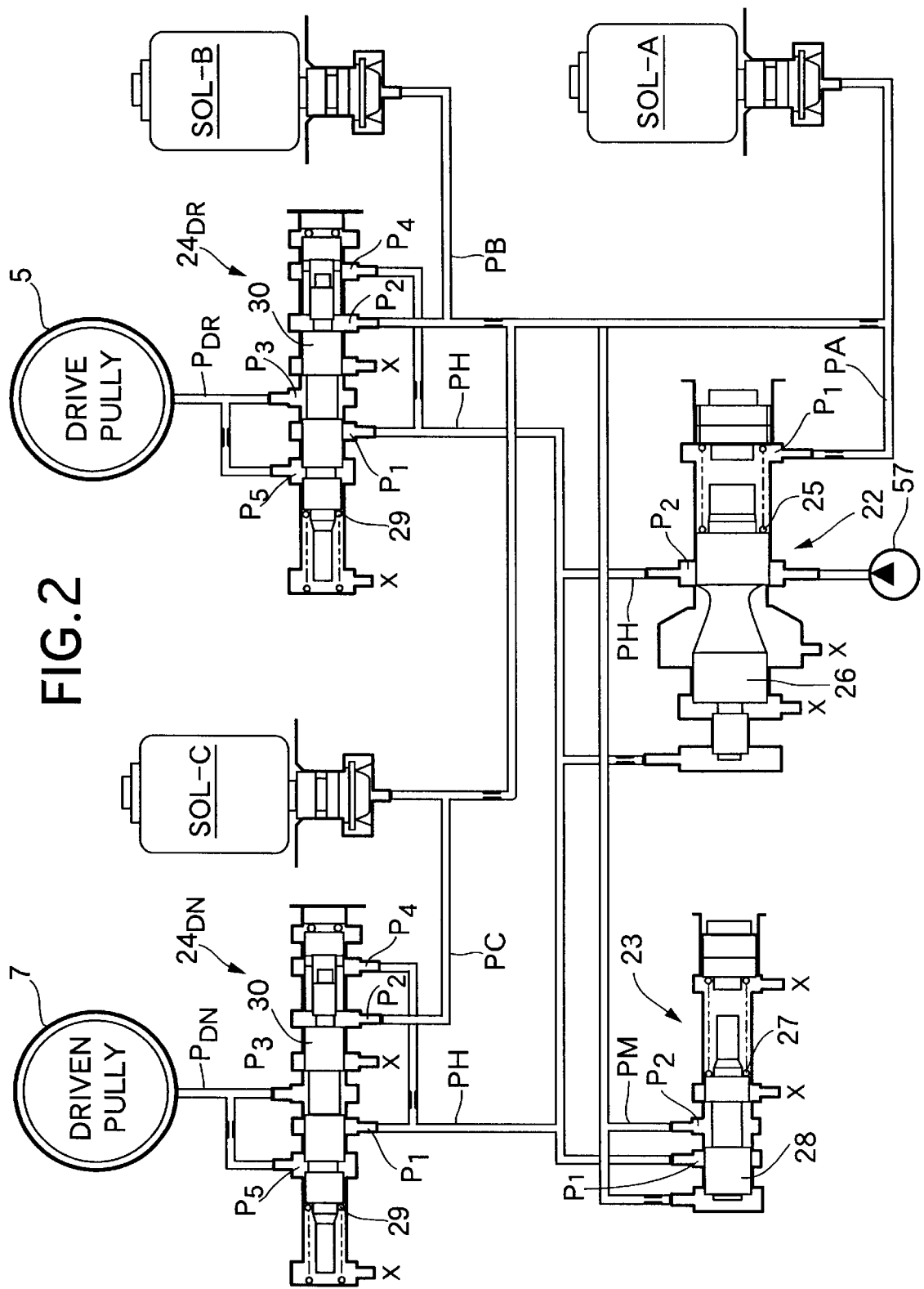
FIG. 2 is a diagram showing a first embodiment of the hydraulic pressure control system of this invention in a belt type continuously variable transmission.

Next, the construction of the first embodiment of the hydraulic control unit Uh of this invention for the belt type continuously variable transmission T will be explained by referring for to FIG. 2.

The oil pressure delivered by an oil pump 57 is reduced by a regulator valve 22 to a PH pressure (line pressure), which is further reduced by a modulator valve 23 down to a PM pressure (modulator pressure). The PH pressure is regulated by a drive pulley control valve $24_{DR}$ and supplied as a drive pulley pressure $P_{DR}$ to the hydraulic chamber 6 of the drive pulley 5. The PH pressure is also regulated by a driven pulley control valve $24_{DN}$ and supplied as a driven pulley pressure $P_{DN}$ to the hydraulic chamber 8 of the driven pulley 7.

The regulator valve 22 has a spool 26 urged toward left by a spring 25. The delivery pressure of the oil pump 57 is regulated by the spool 26, which is actuated toward the left in response to an increase in a PA pressure supplied to a port $P_1$ of the regulator valve 22, and is output as the PH pressure from its port $P_2$. The modulator valve 23 has a spool 28 urged toward the left by a spring 27 and reduces the PH pressure supplied from the regulator valve 22 to its port $P_1$ to output the reduced pressure as the PM pressure from its port $P_2$.

Figure 3:
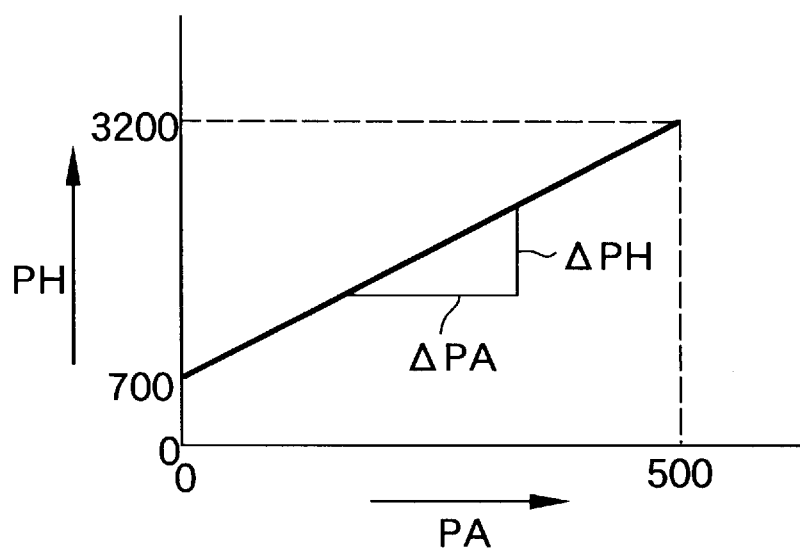
FIG. 3. is a graph showing the hydraulic pressure output characteristic of a regulator valve.

A solenoid valve SOL-A in the form of a bleed solenoid valve regulates the PM pressure from the modulator valve 23 and outputs the PA pressure that controls the regulator valve 22. As shown in FIG. 3, as the PA pressure changes from 0 kPa to 500 kPa, the PH pressure changes linearly from 700 kPa to 3200 kPa.

The drive pulley control valve $24_{DR}$ and the driven pulley control valve $24_{DN}$ have virtually the same structure, in which a spool 30 is urged toward the right by a spring 29. The PH pressure is supplied to the ports $P_1$ of the two control valves $24_{DR}$, $24_{DN}$ while the ports $P_2$ are supplied either with a PB pressure, which is obtained by regulating the PM pressure by a solenoid valve SOL-B formed of a bleed solenoid valve, or with a PC pressure which is produced by regulating the PM pressure by a solenoid valve SOL-C formed of a bleed solenoid valve. As the PB pressure or PC pressure increases, the spool 30 is pushed to left, increasing the drive pulley pressure $P_{DR}$ or the driven pulley pressure $P_{DN}$ output from the port $P_3$ to the hydraulic chamber 6, 8 of the pulley 5, 7, respectively.

Figure 4A:
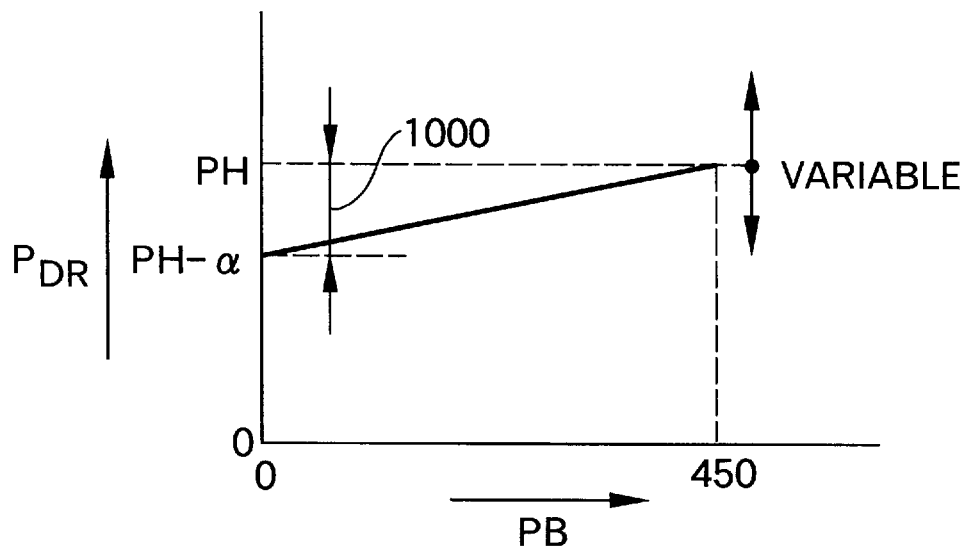
FIG. 4A and 4B are graphs showing hydraulic output characteristics of control valves.
Figure 4B:
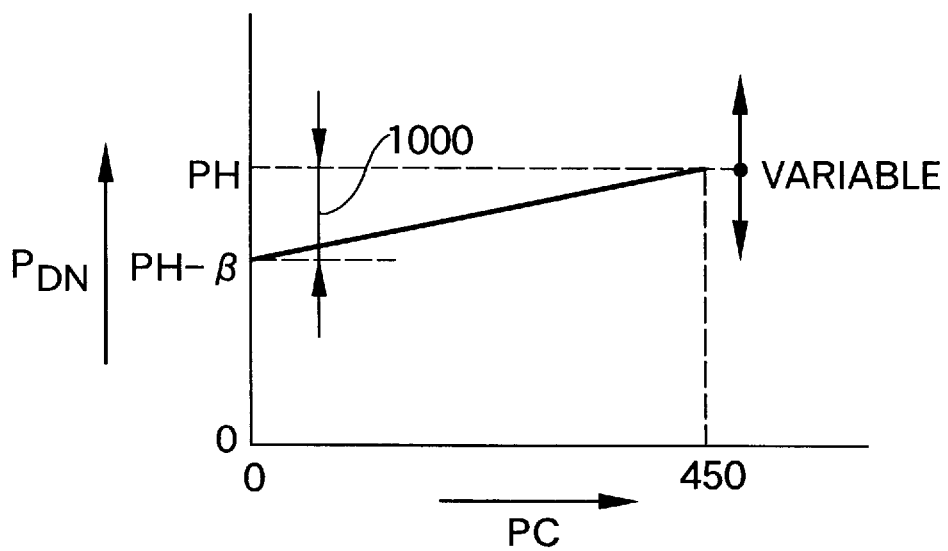

FIG. 4A shows change of the drive pulley pressure $P_{DR}$ according to change of the PB pressure. As the PB pressure increases from 0 kPa to 450 kPa, the drive pulley pressure $P_{DR}$ increases linearly from a PL pressure (PH pressure - α) to the PH pressure. The PH pressure is variable and changes as the PA pressure output from the solenoid valve SOL-A changes (see FIG. 3). The characteristic of change of the driven pulley pressure $P_{DN}$ is identical with that of the drive pulley pressure $P_{DR}$, as shown in FIG. 4B. As the PC pressure increases from 0 kPa to 450 kPa, the driven pulley pressure $P_{DN}$ increases linearly from the PL pressure (PH pressure-β) to the PH pressure. The values α and β are constants and in this embodiment are both set at 1000 kPa.

The three solenoid valves SOL-A, SOL-B, SOL-C are connected to and controlled by the electronic control unit Ue incorporating a microcomputer.

Next, the operation of the embodiment with the above construction will be described.

When the gear ratio of the belt type continuously variable transmission T is to be held, both the PB pressure and the PC pressure output from the solenoid valves SOL-B, SOL-C are set to 0. As a result, the drive pulley pressure $P_{DR}$ transmitted to the hydraulic chamber 6 of the drive pulley 5 and the driven pulley pressure $P_{DN}$ transmitted to the hydraulic chamber 8 of the driven pulley 7 are both equal to the PL pressure (PH pressure-1000 kPa), fixing the groove widths of the both pulleys 5, 7 thereby holding the gear ratio. At this time, by lowering the PA pressure output from the solenoid valve SOL-A to reduce the PH pressure output from the regulator valve 22, it is possible to reduce the load of the oil pump 57 and therefore the fuel consumption while holding the gear ratio of the belt type continuously variable transmission T.

To change the gear ratio of the belt type continuously variable transmission T from the low-speed gear to the overdrive, the PB pressure output from the solenoid valve SOL-B needs to be increased from zero by applying a changing electric current thereto while maintaining the PC pressure output from the solenoid valve SOL-C at zero by applying a fixed electric current thereto. As a result, the drive pulley pressure $P_{DR}$ increases from the PL pressure toward the PH pressure with the driven pulley pressure $P_{DN}$ kept at the PL pressure (PH pressure-1000 kPa), so that the movable pulley half $5_2$ of the drive pulley 5 acted on by the PH pressure moves toward the stationary pulley half $5_1$ to reduce the groove width, causing the movable pulley half $7_2$ of the driven pulley 7 applied with the PL pressure to move away from the stationary pulley half $7_1$ to increase the groove width, thereby changing the gear ratio from the low-speed gear toward the overdrive.

Conversely, to change the gear ratio of the belt type continuously variable transmission T from the overdrive toward the low-speed gear, the PC pressure output from the solenoid valve SOL-C needs to be increased from 0 while keeping the PB pressure output from the solenoid valve SOL-B at 0. Because the driven pulley pressure $P_{DN}$ increases from the PL pressure toward the PH pressure with the drive pulley pressure $P_{DR}$ kept at the PL pressure (PH pressure-1000 kPa), the movable pulley half $7_2$ of the driven pulley 7 applied with the PH pressure moves toward the stationary pulley half $7_1$ to reduce the groove width, causing the movable pulley half $5_2$ of the drive pulley 5 applied with the PL pressure to move away from the stationary pulley half $5_1$ to increase the groove width, thereby changing the gear ratio from the overdrive toward the low-speed gear.

As described above, because the PH pressure, the drive pulley pressure $P_{DR}$ and the driven pulley pressure $P_{DN}$ can be regulated by separate solenoid valves SOL-A, SOL-B, SOL-C, the stability of the hydraulic control system is improved. Further, by setting the output pressure of one of the solenoid valves SOL-B, SOL-C to zero and changing the output pressure of the other solenoid valve to change the PL pressure with respect to the PH pressure, it is possible to set the pressure difference between the PH pressure and the PL pressure arbitrarily and thereby control the time required for the continuously variable transmission T to change gear ratio. Further, because the two solenoid valves SOL-B, SOL-C are not operated simultaneously, only up to two solenoid valves, including the solenoid valve SOL-A, among the three solenoid valves SOL-A, SOL-B, SOL-C, need to be operated simultaneously, thus simplifying the control system.

Figure 10A:
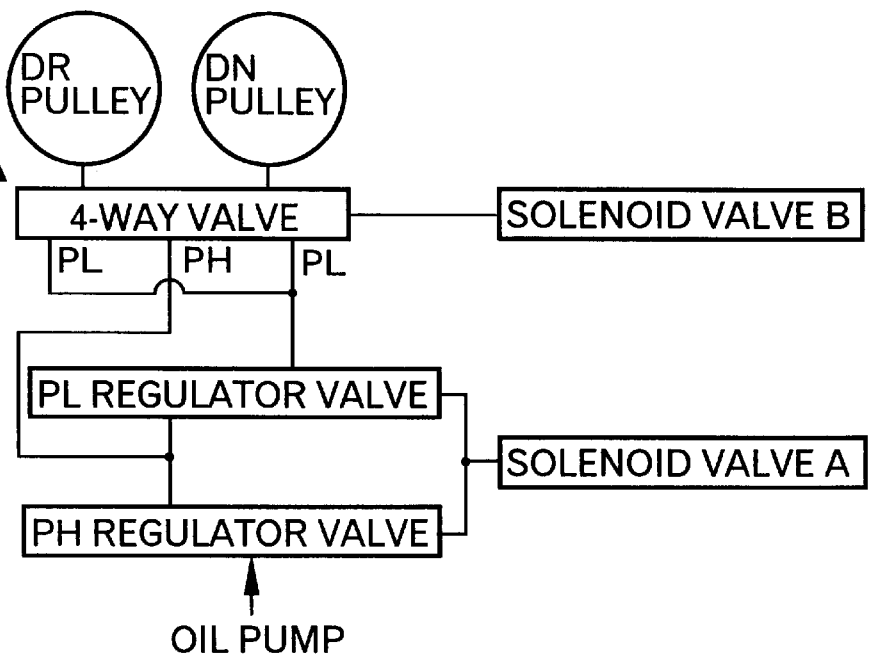
FIG. 10A is a schematic diagram showing a conventional hydraulic control apparatus in a continuously variable transmission, and 10B and 10C are graphs illustrating the operating characteristics of the conventional hydraulic control apparatus of FIG. 10A.
Figure 10B:
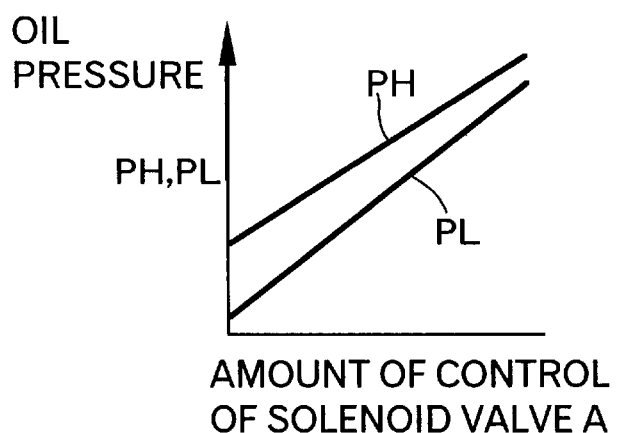
Figure 10C:
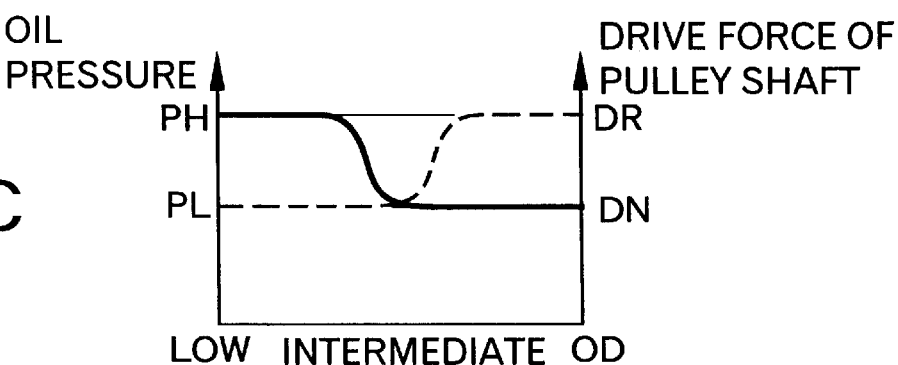

The conventional four-way valve of the conventional system shown in FIGS. 10A, 10B and 10C has a drawback that the dimensional control of an overlap between the spool groove and the valve body port is difficult and that the amount of change in the output pressure is large with respect to the spool stroke, making precise control difficult. Because the four-way is eliminated, this problem is solved with this embodiment of the invention. Further, when electricity to the solenoid valves SOL-A, SOL-B, SOL-C is cut off in the event of a failure in the control system, the gear ratio of the belt type continuously variable transmission T can be held as it is and prevented from changing rapidly toward the overdrive or the low-speed gear.

Figure 5:
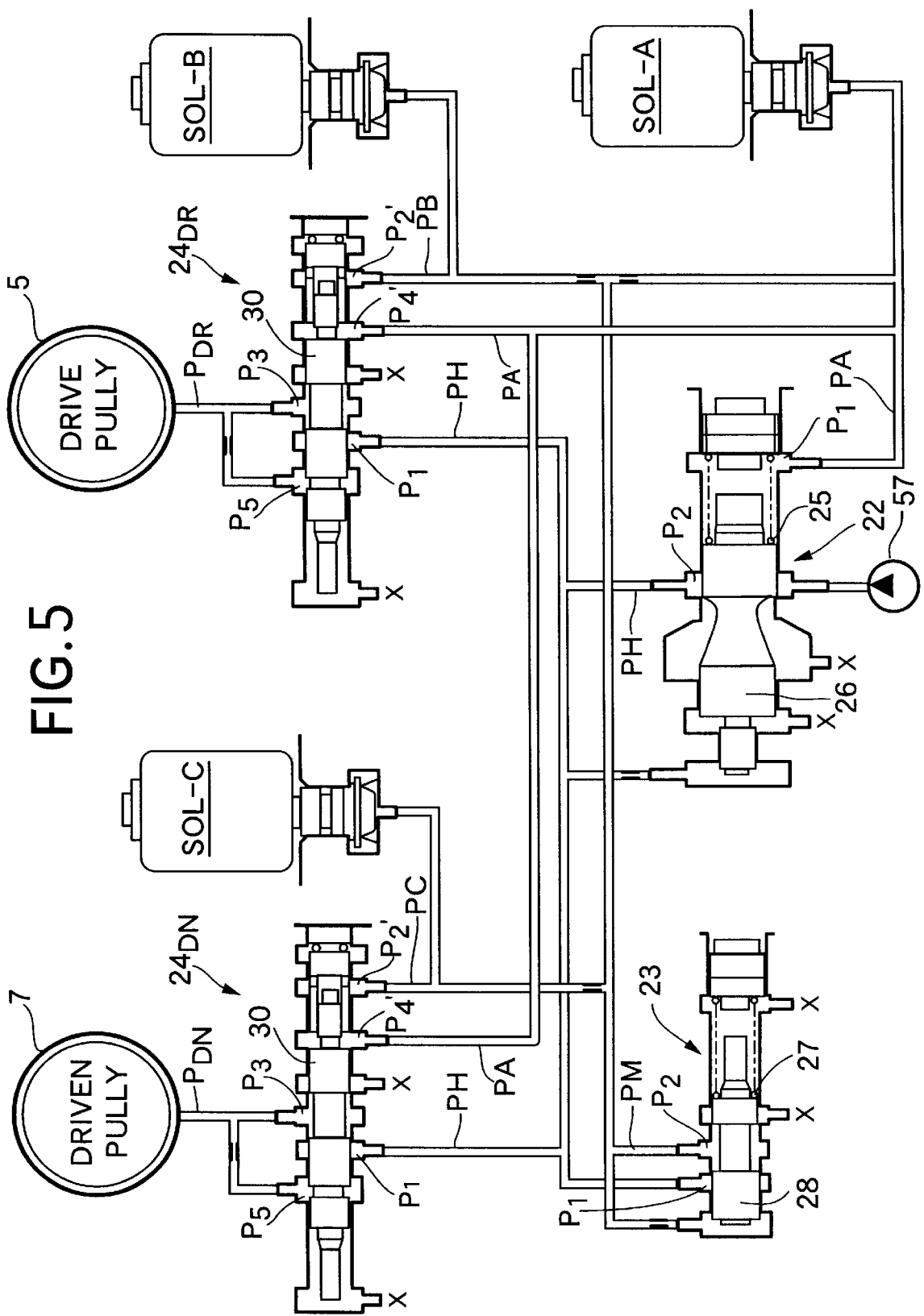
FIG. 5. is a diagram showing a second embodiment of the hydraulic control system of this invention in a belt type continuously variable transmission.
Figure 6A:
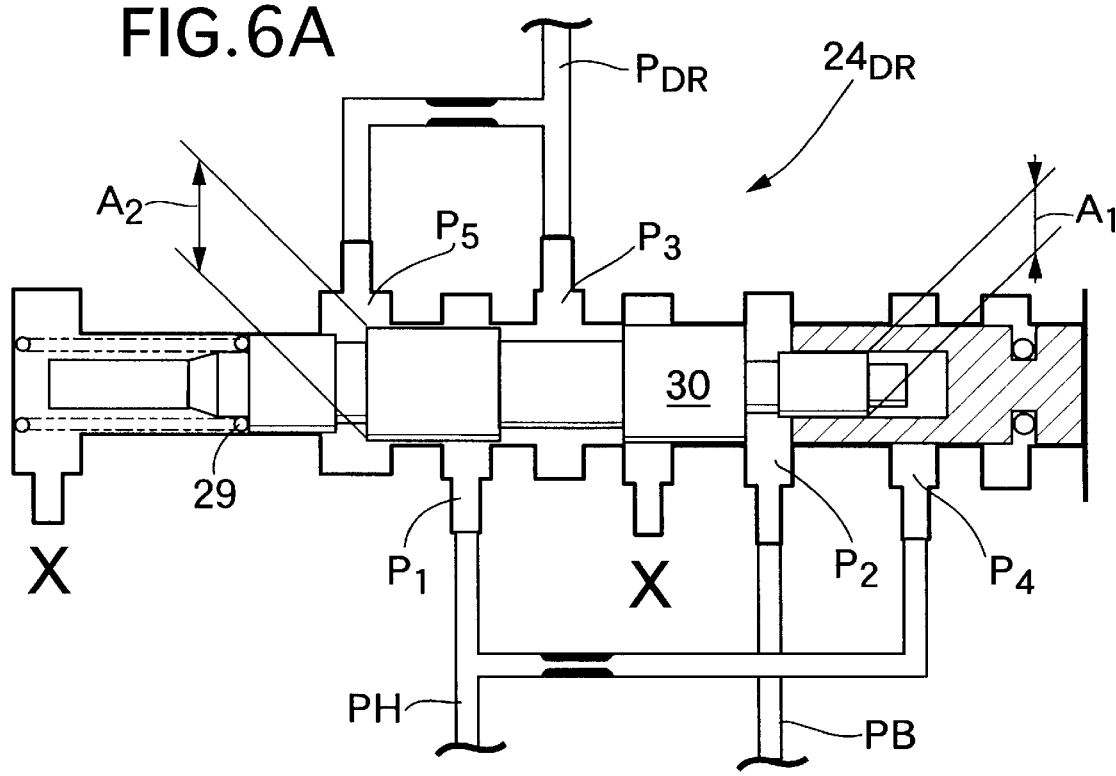
FIG. 6A and 6B are enlarged views of the control valve shown in FIG. 5.
Figure 6B:
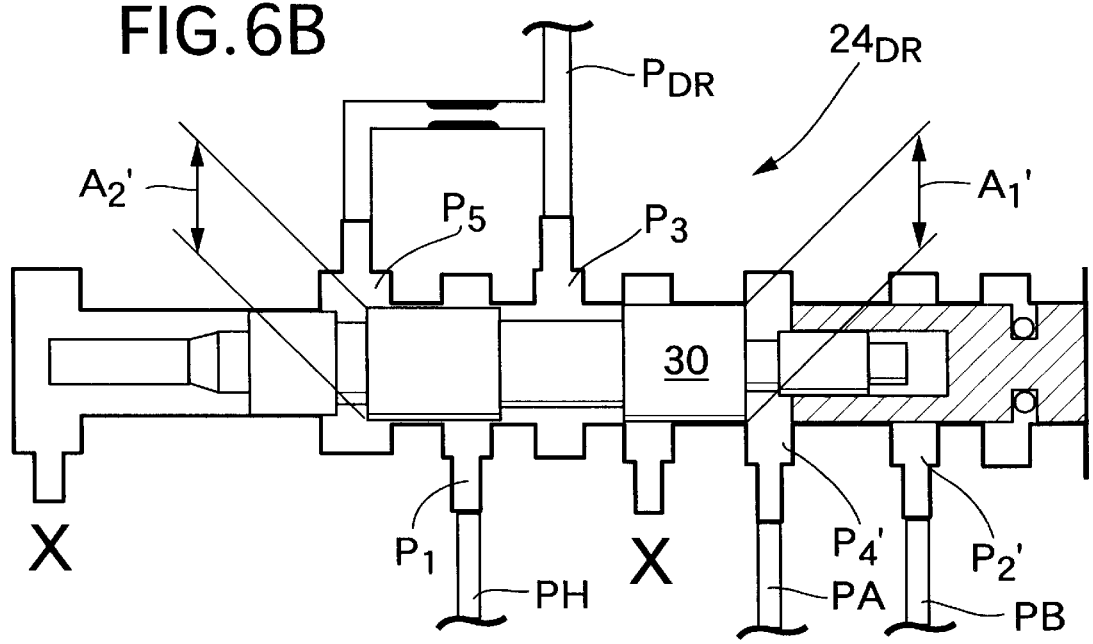

FIGS. 5, 6A and 6B show a second embodiment of this invention, with FIG. 5 representing a hydraulic control system of the belt type continuously variable transmission and FIGS. 6A and 6B representing enlarged cross sectional views of the control valves $24_{DR}$ and $24_{DN}$.

The second embodiment differs from the first embodiment in the construction of the drive pulley control valve $24_{DR}$ and the driven pulley control valve $24_{DN}$ that cause the pulley pressures $P_{DR}$, $P_{DN}$ to follow PH pressure changes. Other structures of the system are virtually identical with those of the first embodiment. Since the two control valves $24_{DR}$, $24_{DN}$ are identical in structure, only the drive pulley control valve $24_{DR}$ will be explained.

FIG. 6A shows the drive pulley control valve $24_{DR}$ of the first embodiment, in which the port $P_1$ and port $P_4$ are supplied with the PH pressure, the port $P_2$ with the PB pressure, the port $P_5$ with the pulley pressure $P_{DR}$, and the port $P_3$ outputs the pulley pressure $P_{DR}$. The PH pressure entering the port $P_4$ urges the spool 30 toward the left, and the pulley pressure $P_{DR}$ entering the port $P_5$ urges the spool 30 toward the right. The pressure receiving area of the spool 30 acted on by the PH pressure is $A_1$ and the pressure receiving area of the spool 30 acted on by the pulley pressure $P_{DR}$ is $A_2$. When the PH pressure changes by $\Delta$PH and the pulley pressure $P_{DR}$ by $\Delta P_{DR}$, the following relation must hold to keep the spool 30 at a balanced position without moving.

$$A_1 \times \Delta PH = A_2 \times \Delta P_{DR} \qquad (1)$$

Hence, by setting the pressure receiving areas in equation (1) as $A_1=A_2$, $\Delta$PH equals $\Delta P_{DR}$ to cause the pulley pressure $P_{DR}$ to follow the PH pressure change.

As can be seen from FIG. 6B, the second embodiment of the hydraulic control system has the port $P_4'$ supplied with the PA pressure output from the solenoid valve SOL-A instead of the PH pressure. That is, the second embodiment differs from the first embodiment in that the PA pressure, rather than the PH pressure used in the first embodiment, is supplied to the port $P_4'$ to cause the pulley pressure $P_{DR}$ to follow the PH pressure change.

As is seen from FIG. 3, the ratio of a change $\Delta$PH of the PH pressure to a change $\Delta$PA of the PA pressure is constant. Thus the following relation holds.

$$\Delta PA = K \times \Delta PH \qquad (2)$$

where K is a constant

When the PA pressure increases or decreases by $\Delta$PA and the pulley pressure $P_{DR}$ by $\Delta P_{DR}$, the following relation must hold for the spool 30 to be kept at a balanced position without moving.

$$A_1' \times \Delta PA = A_2' \times \Delta P_{DR} \qquad (3)$$

Rewriting the equation (3) by using the equation (2) results in $$A_1' \times K \times \Delta PH \times A_2' \times \Delta P_{DR} \qquad (4)$$

By setting the pressure receiving areas $A_1'$, $A_2'$ in the equation (1) as follows $$A_1' \times K = A_2' \qquad (5)$$

it is possible to make $\Delta$PH equal $\Delta P_{DR}$ and thereby cause the pulley pressure $P_{DR}$ to follow the PH pressure change.

When the engine E is running at low speeds, the revolution of the oil pump 57 decreases, reducing the amount of oil delivered. So, the PH pressure output from the regulator valve 22 may become lower than the set value regardless of the value of the control signal output from the electronic control unit Ue to the solenoid valve SOL-A (i.e., output pressure of the solenoid valve SOL-A to the regulator valve 22). Hence, when the PH pressure is supplied to the port $P_4'$ of the control valve $24_{DR}$ to cause the pulley pressure $P_{DR}$ to automatically follow the PH pressure change, as in the first embodiment, there is a possibility of the pulley pressure $P_{DR}$ becoming lower than the PL pressure as it follows the PH pressure that has gone below the set value.

With the second embodiment, however, the PA pressure supplied to the port $P_4'$ of the control valve $24_{DR}$ uses as a source pressure the PM pressure that is lower than the PH pressure and thus the above trouble can be avoided. To describe in more detail, even when the PH pressure goes lower than the set value during the low speed operation of the engine E, the PM pressure, which is lower than the PH pressure, is kept at the set value, holding the PA pressure, which is based on the PM pressure, at the set value. Hence, changing the pulley pressure $P_{DR}$ based on the PA pressure can prevent the pulley pressure $P_{DR}$ from decreasing below the PL pressure as the PH pressure lowers.

Supplying the high PH pressure to the port $P_4'$ of the control valve $24_{DR}$ increases an oil leakage resulting in pressure reduction. Using the low PA pressure rather than the high PH pressure reduces the oil leakage and therefore the load of the oil pump 57.

Figure 7:
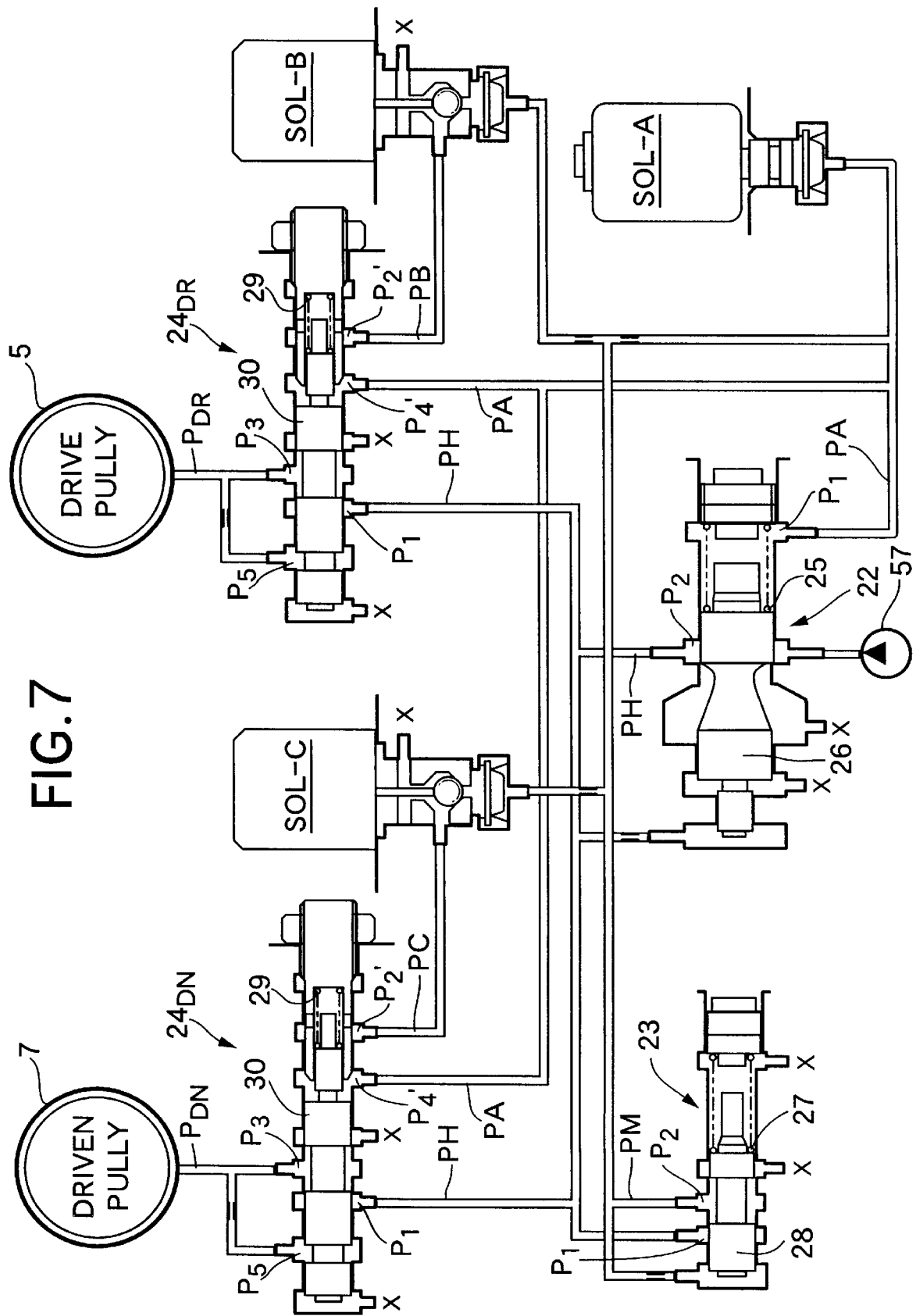
FIG. 7 is a diagram showing a third embodiment of the hydraulic control system of this invention in a belt type continuously variable transmission.
Figure 8:
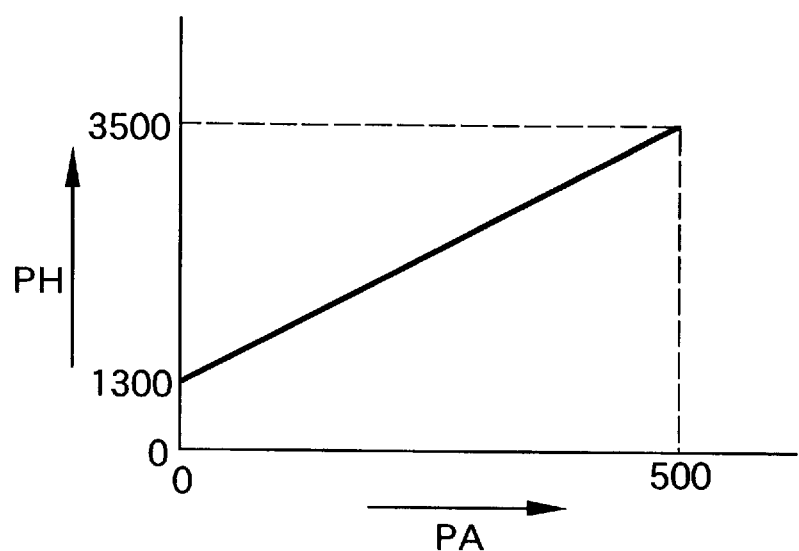
FIG. 8 is a graph showing a hydraulic output characteristic of the regulator valve.
Figure 9A:
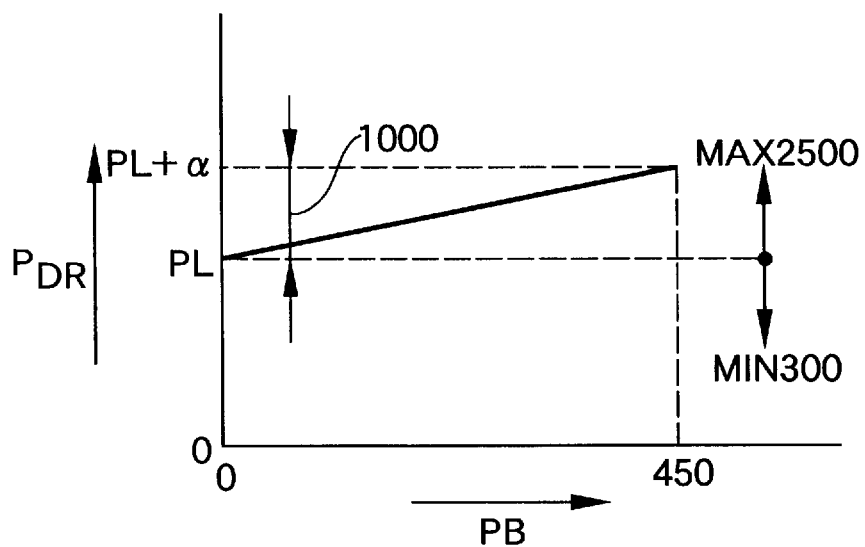
FIGS. 9A and 9B are graphs showing hydraulic output characteristics of the control valves.
Figure 9B:
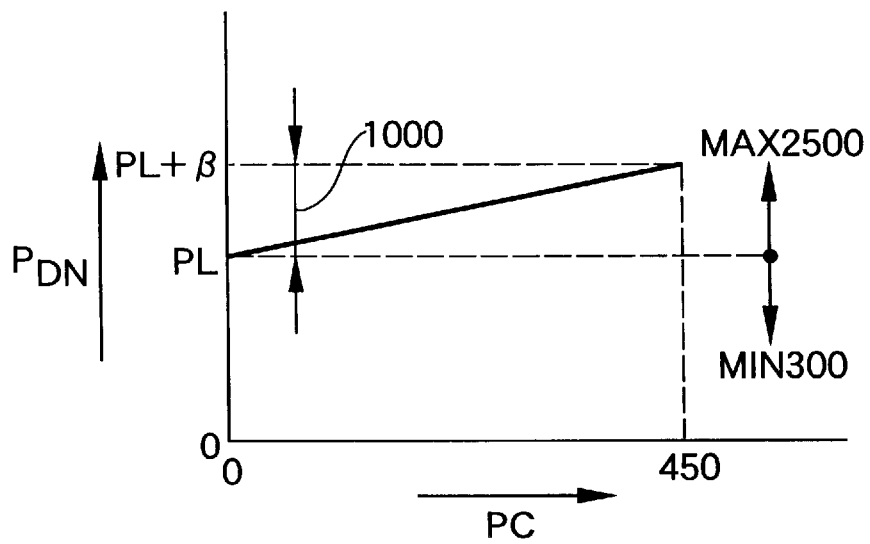

FIGS. 7, 8, 9A and 9B represent a third embodiment of this invention, with FIG. 7 showing a hydraulic control system of the belt type continuously variable transmission, FIG. 8 a graph of hydraulic output characteristic of the regulator valve, and FIGS. 9A and 9B graphs of hydraulic output characteristics of the control valves.

As shown in FIG. 7, the hydraulic circuit of the third embodiment resembles that of the second embodiment (see FIG. 5), except that the characteristics of the regulator valve 22 and the control valves $24_{DR}$, $24_{DN}$ differ from those of the second embodiment and that three-way duty solenoid valves are employed as the solenoid valves SOL-B, SOL-C instead of the bleed solenoid valves.

As in the second embodiment, the line pressure PH produced by the regulator valve 22 is supplied to the ports $P_1$, $P_1$ of the both control valves $24_{DR}$, $24_{DN}$. The PA pressure produced by the solenoid valve SOL-A based on the PM pressure output from the modulator valve 23 is supplied to the port $P_1$ of the regulator valve 22 and to the ports $P_4'$, $P_4'$ of both the control valves $24_{DR}$, $24_{DN}$, and the PB pressure and the PC pressure produced by the solenoid valves SOL-B, SOL-C, respectively, based on the PM pressure, are supplied to the ports $p_2'$, $P_2'$ of the control valves $24_{DR}$, $24_{DN}$.

The line pressure produced by the regulator valve 22 is the PL pressure plus a predetermined pressure difference (described later, 1000 kPa in this embodiment) and is controlled by the PA pressure output from the solenoid valve SOL-A. As shown in FIG. 8, when the PA pressure changes from 0 kPA to 500 kPA, the line pressure PH changes linearly from 1300 kPA to 3500 kPA.

The control valves $24_{DR}$, $24_{DN}$ regulate the line pressure, as a source pressure, to produce the pulley pressures $P_{DR}$, $P_{DN}$. As shown in FIG. 9A and 9B, the control valves $24_{DR}$, $24_{DN}$ produce the PL pressure when the PB pressure or PC pressure output from the solenoid valve SOL-B, SOL-C, respectively, is 0 kPa and, when the PB or PC pressure is 450 kPa, produce the line pressure (PL pressure+pressure difference). That is, when the PB or PC pressure is 0 kPa, the line pressure (PL pressure+pressure difference) and the pulley pressures $P_{DR}$, $P_{DN}$ (PL pressure) change according to the PA pressure change, during which time the pressure difference is kept constant (at 1000 kPa). As the PB or PC pressure is increased from 0 kPa to 450 kPa, the pressure difference decreases from 1000 kPa to 0 kPa, causing the pulley pressures $P_{DR}$, $P_{DN}$ to rise to the line pressure (PL pressure+pressure difference).

In order to hold the gear ratio of the belt type continuously variable transmission T, the PB and PC pressures produced by the solenoid valves SOL-B, SOL-C are both set to zero. As a result, the drive pulley pressure $P_{DR}$ applied to the hydraulic chamber 6 of the drive pulley 5 and the driven pulley pressure $P_{DN}$ applied to the hydraulic chamber 14 of the driven pulley 7 are both equal to the PL pressure, fixing the widths of the grooves of both pulleys 5, 7 and thus holding the gear ratio. At this time, if the PA pressure produced by the solenoid valve SOL-A is reduced to lower the PL pressure, it is possible to reduce the load of the oil pump 57 and therefore the fuel consumption while holding the gear ratio of the belt type continuously variable transmission T.

To change the gear ratio of the belt type continuously variable transmission T from the low-speed gear toward the overdrive, the PB pressure produced by the solenoid valve SOL-B needs only to be increased from zero while maintaining the PC pressure produced by the solenoid valve SOL-C at zero. This causes the drive pulley pressure $P_{DR}$ to increase from the PL pressure toward the line pressure (PL pressure+pressure difference) with the driven pulley pressure $P_{DN}$ kept at the PL pressure, thus changing the gear ratio from the low-speed gear toward the overdrive. Conversely, to change the gear ratio of the belt type continuously variable transmission T from the overdrive toward the low-speed gear, the PC pressure produced by the solenoid valve SOL-C needs to be increased from zero while holding the PB pressure produced by the solenoid valve SOL-B at zero. As a result, the driven pulley pressure $P_{DN}$ rises from the PL pressure toward the line pressure (PL pressure+pressure differential) with the drive pulley pressure $P_{DR}$ kept at the PL pressure, thereby causing the gear ratio to change from the overdrive toward the low-speed gear.

In terms of improving the control precision of the gear ratio, the accuracy of the low PL pressure is more important than that of the high PH pressure, these pressures working as the pulley pressures $P_{DR}$, $P_{DN}$. In the second embodiment, because the PH pressure produced by the regulator valve 22 is reduced by the control valves $24_{DR}$, $24_{DN}$ by the pressure difference to output the PL pressure, the errors in the PH pressure caused by PA pressure variations output from the solenoid valve SOL-A and the errors in the pressure difference caused by PB or PC pressure variations output from the solenoid valve SOL-B, SOL-C combine to reduce the accuracy of the PL pressure, although still more accurate than the prior art system. However, in the third embodiment because the PL pressure requiring high accuracy depends only on the PA pressure, the control precision is not degraded by variations of the PB or PC pressure. Although in the third embodiment the PH pressure is affected by variations of the PA pressure and by variations of the PB or PC pressure and its accuracy is degraded, because the PH pressure does not require as high an accuracy as the PL pressure, the degraded accuracy of the PH pressure does not practically pose any problem.

As described above, since variations of the PB or PC pressure do not affect the PL pressure that requires high accuracy, the solenoid valves SOL-B, SOL-C can use three-way duty solenoid valves (see FIG. 7) with relatively low precision, instead of the high-precision bleed solenoid valves. The three-way duty solenoid valve has a feature that it has a significantly smaller oil leakage than that of the bleed solenoid valve, which in turn reduces the load of the oil pump 57 and also prevents a fall of the line pressure when the engine revolution speed is reduced.

According to one aspect of the invention, with this hydraulic control apparatus it is possible to change the pressure difference between the drive pulley pressure and the driven pulley pressure according to changes in the electric current values to control the speed change time. In addition, because the drive pulley pressure and the driven pulley pressure are controlled independently by the first control valve and the second control valve, the stability of the hydraulic control system is improved. Furthermore, because the first solenoid valve and the second solenoid valve are not activated simultaneously, the load on the control means is alleviated. Another advantage is that because the conventional four-way valve can be eliminated, whose overlap dimension between the spool groove and the valve body port is difficult to control and whose output pressure change is sharp with respect to the spool stroke, a precise control of the pulley pressure can be accomplished.

According to another aspect of the invention, because the line pressure produced by the regulator valve is regulated by the third control pressure output from the third solenoid valve, it is possible to lower the line pressure and therefore the hydraulic load when the electric currents of the first solenoid valve and the second solenoid valve are held to fix the gear ratio.

According to still another aspect of the invention, because a change in the line pressure output from the regulator valve is made proportional to a change in the third control pressure, which is lower than the line pressure, and the spools of the first and second control valves are urged in opposite directions by the pulley pressure and the third control pressure and held at balanced positions, it is possible to reduce an oil leakage by using the third control pressure, which is lower than the line pressure, as a hydraulic pressure for holding the spools in the balanced positions and causing the change in the pulley pressure to follow the change in the line pressure.

According to a further aspect of the invention, the pulley pressure produced by a control valve, which is controlled by a solenoid valve whose supplied electric current is fixed, is a low-pressure side pulley pressure and the pulley pressure produced by a control valve, which is controlled by a solenoid valve whose supplied electric current is changed, is a high-pressure side pulley pressure that has a pressure difference with respect to the low-pressure side pulley pressure, whereby the pressure difference corresponds to the changing solenoid valve current. This prevents the low-pressure side pulley pressure requiring high accuracy from being affected by errors in the pressure difference, thus enhancing the accuracy of the speed change control.

The embodiments of this invention have been described in detail and it is understood that various design modifications may be made without departing from the spirit and scope of the invention.

What is claimed:

1. A hydraulic control apparatus for a continuously variable transmission in which an endless belt is reeved around a drive pulley and a driven pulley and in which a drive pulley pressure and a driven pulley pressure are supplied to a hydraulic chamber of the drive pulley and a hydraulic chamber of the driven pulley, respectively, to change groove widths of the pulleys and thereby control a gear ratio; the hydraulic control apparatus comprising:

a regulator valve to produce a line pressure;

a first solenoid valve to produce a first control pressure;

a first control valve to produce the drive pulley pressure by regulating the line pressure according to the first control pressure;

a second solenoid valve to produce a second control pressure;

a second control valve to produce the driven pulley pressure by regulating the line pressure according to the second control pressure; and a control means to perform a gear change by fixing an electric current value applied to one of the first solenoid valve and the second solenoid valve and changing an electric current value applied to the other of said first and second solenoid valves.

2. A hydraulic control apparatus for a continuously variable transmission according to claim 1, wherein the line pressure produced by the regulator valve is regulated according to a third control pressure output from a third solenoid valve.

3. A hydraulic control apparatus for a continuously variable transmission according to claim 2, wherein a change in the line pressure produced by the regulator valve is made proportional to a change in the third control pressure and said third control pressure is lower than the line pressure, and said first and second control valves have spools that are urged in opposite directions by the pulley pressure and the third control pressure to hold the spools in balanced positions.

4. A hydraulic control apparatus for a continuously variable transmission according to claim 1, wherein the pulley pressure produced by the control valve which is controlled by the solenoid valve whose applied electric current value is fixed, is a low-pressure side pulley pressure, and the pulley pressure produced by the control valve which is controlled by the solenoid valve whose applied electric current value is changed, is a high-pressure side pulley pressure that has a pressure difference with respect to the low-pressure side pulley pressure, wherein the pressure difference corresponds to the changing solenoid current value.

* * * * *